US010990872B2

(12) United States Patent
Akopyan et al.

(10) Patent No.: US 10,990,872 B2
(45) Date of Patent: Apr. 27, 2021

(54) ENERGY-EFFICIENT TIME-MULTIPLEXED NEUROSYNAPTIC CORE FOR IMPLEMENTING NEURAL NETWORKS SPANNING POWER- AND AREA-EFFICIENCY

(71) Applicant: International Business Machines Corporation, Armonk, NY (US)

(72) Inventors: Filipp A. Akopyan, New Windsor, NY (US); Rodrigo Alvarez-Icaza, Mountain View, CA (US); John V. Arthur, Mountain View, CA (US); Andrew S. Cassidy, San Jose, CA (US); Steven K. Esser, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 15/087,898

(22) Filed: Mar. 31, 2016

(65) Prior Publication Data
US 2017/0286825 A1 Oct. 5, 2017

(51) Int. Cl.
*G06N 3/04* (2006.01)
*G06N 3/063* (2006.01)

(52) U.S. Cl.
CPC .............. *G06N 3/04* (2013.01); *G06N 3/049* (2013.01); *G06N 3/063* (2013.01)

(58) Field of Classification Search
CPC .......... G06N 3/063; G06N 3/049; G06N 3/04
See application file for complete search history.

(56) References Cited

U.S. PATENT DOCUMENTS

| 8,868,477 | B2 | 10/2014 | Esser et al. |
| 8,898,097 | B2 | 11/2014 | Brezzo et al. |

(Continued)

FOREIGN PATENT DOCUMENTS

| CN | 105095961 A | 11/2015 |
| CN | 105095965 A | 11/2015 |

(Continued)

OTHER PUBLICATIONS

Minkovich, Kirill et al., "Programming Time-Multiplexed Reconfigurable Hardware Using a Scalable Neuromorphic Compiler," IEEE Transactions on Neural Networks and Learning Systems, vol. 23, No. 6, Jun. 2012, pp. 889-901 (Year: 2012).*

(Continued)

*Primary Examiner* — Kakali Chaki
*Assistant Examiner* — Robert Lewis Kulp
(74) *Attorney, Agent, or Firm* — Zilka-Kotab, P.C.

(57) ABSTRACT

A multiplexed neural core circuit according to one embodiment comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

23 Claims, 10 Drawing Sheets

(56) References Cited

U.S. PATENT DOCUMENTS

| | | | |
|---|---|---|---|
| 8,909,576 | B2 | 12/2014 | Akopyan et al. |
| 8,977,578 | B1 | 3/2015 | Cruz-Albrecht et al. |
| 8,977,583 | B2 | 3/2015 | Modha |
| 8,990,130 | B2 | 3/2015 | Alvarez-Icaza Rivera et al. |
| 9,275,328 | B1* | 3/2016 | Minkovich ............ G06N 3/088 |
| 9,940,574 | B1* | 4/2018 | Thibeault ............... G06N 3/063 |
| 2012/0259804 | A1 | 10/2012 | Brezzo et al. |
| 2014/0180987 | A1* | 6/2014 | Arthur ................... G06N 3/049 706/25 |
| 2014/0180988 | A1 | 6/2014 | Alvarez-Icaza Rivera et al. |
| 2014/0222740 | A1* | 8/2014 | Alvarez-Icaza Rivera ................. G06N 3/04 706/28 |
| 2015/0058268 | A1 | 2/2015 | Modha |
| 2015/0254551 | A1 | 9/2015 | Alvarez-Icaza Rivera et al. |
| 2015/0324684 | A1 | 11/2015 | Alvarez-Icaza Rivera et al. |
| 2016/0004962 | A1 | 1/2016 | Appuswamy et al. |

FOREIGN PATENT DOCUMENTS

| | | |
|---|---|---|
| CN | 105095966 A | 11/2015 |
| CN | 105095967 A | 11/2015 |

OTHER PUBLICATIONS

Minkovich et al. ("Programming Time-Multiplexed Reconfigurable Hardware Using a Scalable Neuromorphic Compiler," IEEE Transactions on Neural Networks and Learning Systems, vol. 23, No. 6, Jun. 2012, pp. 889-901) (Year: 2012).*

Merolla et al. ("A million spiking-neuron integrated circuit with a scalable communication network and interface", Science, vol. 345 Issue 6197, Aug. 8, 2014, pp. 668-673) (Year: 2014).*

Cruz-Albrecht et al ("A scalable neural chip with synaptic electronics using CMOS integrated memristors", Nanotechnology 24 (2013) 384011, 2013, pp. 1-11) (Year: 2013).*

Minkovich et al. ("Programming Time-Multiplexed Reconfigurable Hardware Using a Scalable Neuromorphic Compiler," IEEE Transactions on Neural Networks and Learning Systems, vol. 23, No. 6, Jun. 2012, pp. 889-901) (Year: 2012).*

Merolla et al. ("A million spiking-neuron integrated circuit with a scalable communication network and interface: Supplementary Material", Science, vol. 345 Issue 6197, pp. 1-25, Sep. 11, 2014) (Year: 2014).*

Peng et al., "Toward Energy Efficient Neural Interfaces," IEEE Transactions on Biomedical Engineering, vol. 56, No. 11, Nov. 2009, pp. 2697-2700.

Chaudhari, P., "Neural Network for Information Processing," ip.com, Feb. 19, 2005, pp. 1-2.

Platt et al., "Constrained Differential Optimization for Neural Networks," ip.com, Apr. 12, 2007, pp. 1-11.

Anonymous, "A method for Energy Efficiency in Wireless Network Cloud Environment," ip.com, May 13, 2013, pp. 1-7.

Akopyan et al., U.S. Appl. No. 14/229,760, filed Mar. 28, 2014.

Rivera et al., U.S. Appl. No. 13/683,234, filed Nov. 21, 2012.

International Search Report and Written Opinion from PCT Application No. PCT/IB2017/051392, dated Jun. 22, 2017.

Office Action from Japanese Patent Application No. 2018-547291, dated Nov. 10, 2020.

Office Action from Japanese Patent Application No. 2018-547291, dated Mar. 9, 2021.

\* cited by examiner

ENERGY-EFFICIENT TIME-MULTIPLEXED NEUROSYNAPTIC CORE FOR IMPLEMENTING NEURAL NETWORKS SPANNING POWER- AND AREA-EFFICIENCY

BACKGROUND

The present invention relates to neurosynaptic networks, and more specifically, this invention relates to time-division multiplexed neurosynaptic cores.

Core-based neurosynaptic systems are built of multiple neurosynaptic cores, where the neurosynaptic cores are configured and connected to form a neurosynaptic network. A single neurosynaptic chip contains a fixed number of neurosynaptic cores. For example, a single neurosynaptic chip may contain hundreds or thousands of cores. Chips of various sizes, i.e., number of cores, can be manufactured. To implement a neurosynaptic system, one or more chips are needed. Because manufacturing neurosynaptic chips is expensive, it is desirable to minimize the number of chips used by a given system.

In some environments, a large number of neurosynaptic cores may be programmed to perform the same function. Still yet, a given configuration of neurosynaptic cores may be tiled across a chip multiple times. In other words, a layout or connectivity between cores may be repeated across a chip or chips multiple times, such that a first group of cores is performing the same task(s) as a second group of cores.

SUMMARY

A multiplexed neural core circuit according to one embodiment comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

According to another embodiment, a computer-implemented method for multiplexing a neural core circuit comprises, for an integer multiplexing factor T that is greater than zero, configuring T sets of electronic neurons, configuring T sets of electronic axons, where each set of the T sets of electronic axons corresponds to one of the T sets of electronic neurons, and configuring an synaptic interconnection network comprising a plurality of electronic synapses that each interconnect a single electronic axon to a single electronic neuron, where the interconnection network interconnects each set of the T sets of electronic axons to its corresponding set of electronic neurons.

According to yet another embodiment, a neurosynaptic system comprises a neurosynaptic chip, a single-core neurosynaptic module as a component on a chip, or a multi-core neurosynaptic module as a component on a chip, including a plurality of multiplexed neural core circuits interconnected via an on-chip network, where each of the plurality of multiplexed neural core circuits comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

Other aspects and embodiments of the present invention will become apparent from the following detailed description, which, when taken in conjunction with the drawings, illustrate by way of example the principles of the invention.

DETAILED DESCRIPTION

Figure 1:
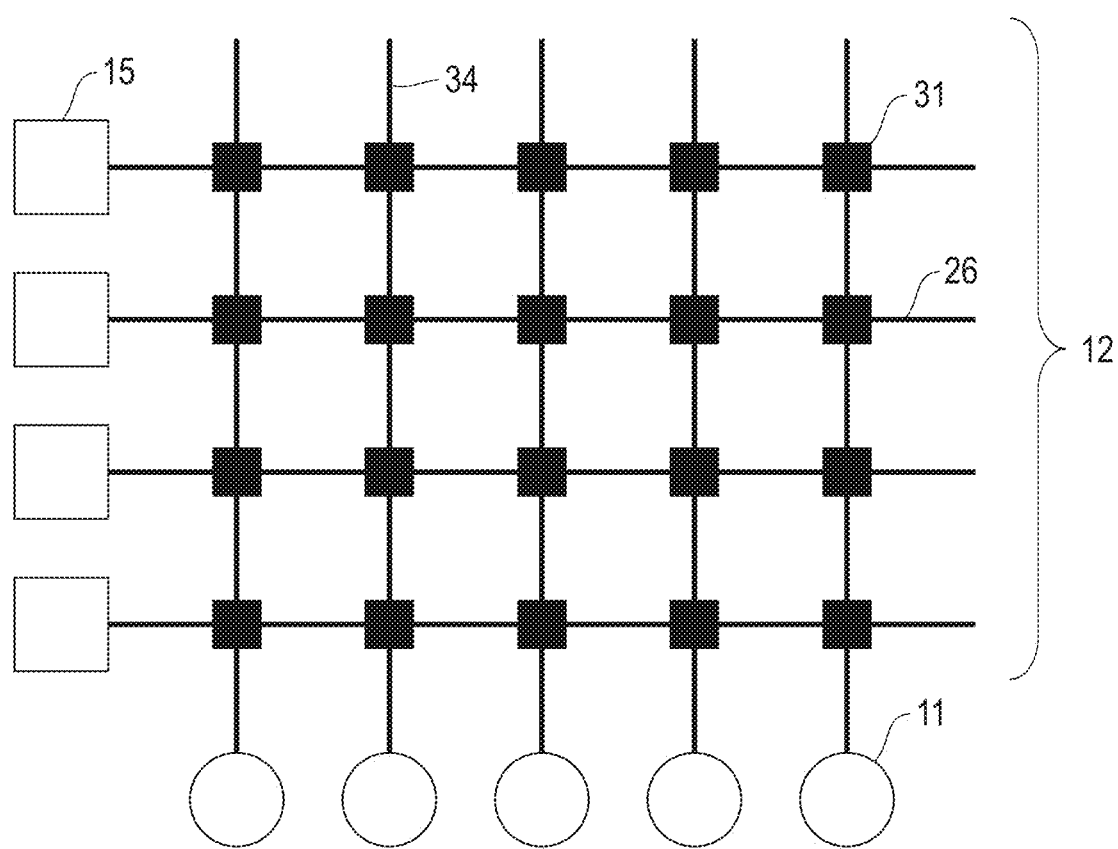
FIG. 1 illustrates a neurosynaptic core module, in accordance with an embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for multiplexing neurosynaptic cores.

In one general embodiment, a multiplexed neural core circuit comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

In another general embodiment, a computer-implemented method for multiplexing a neural core circuit comprises, for an integer multiplexing factor T that is greater than zero, configuring T sets of electronic neurons, configuring T sets of electronic axons, where each set of the T sets of electronic axons corresponds to one of the T sets of electronic neurons, and configuring an synaptic interconnection network comprising a plurality of electronic synapses that each interconnect a single electronic axon to a single electronic neuron, where the interconnection network interconnects each set of the T sets of electronic axons to its corresponding set of electronic neurons.

In another general embodiment, a neurosynaptic system comprises a neurosynaptic chip, a single-core neurosynaptic module as a component on a chip, or a multi-core neurosynaptic module as a component on a chip, including a plurality of multiplexed neural core circuits interconnected via an on-chip network, where each of the plurality of multiplexed neural core circuits comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

FIG. 1 illustrates a neurosynaptic core module ("neurosynaptic core" or "core") 10, in accordance with an embodiment of the invention. The core 10 is a neural core circuit/neurosynaptic core circuit. The core 10 comprises multiple incoming axons 15 and multiple neurons 11. Each neuron 11 and each axon 15 has configurable operational parameters. The core 10 further comprises a synaptic crossbar 12 including multiple synapses 31, multiple rows/axon paths 26, and multiple columns/dendrite paths 34.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends spikes to the connected axon path 26. Each neuron 11 is connected to a dendrite path 34, such that said neuron 11 receives spikes from the connected dendrite path 34.

Each synapse 31 has a synaptic weight. The synaptic weights of the synapses 31 of the core 10 may be represented by a weight matrix W, wherein an element $W_{ij}$ of the matrix W represents a synaptic weight of a synapse 31 located at a row/axon path i and a column/dendrite path j of the crossbar 12. In one embodiment, the synapses 31 are binary memory devices. For example, each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

Figure 2:
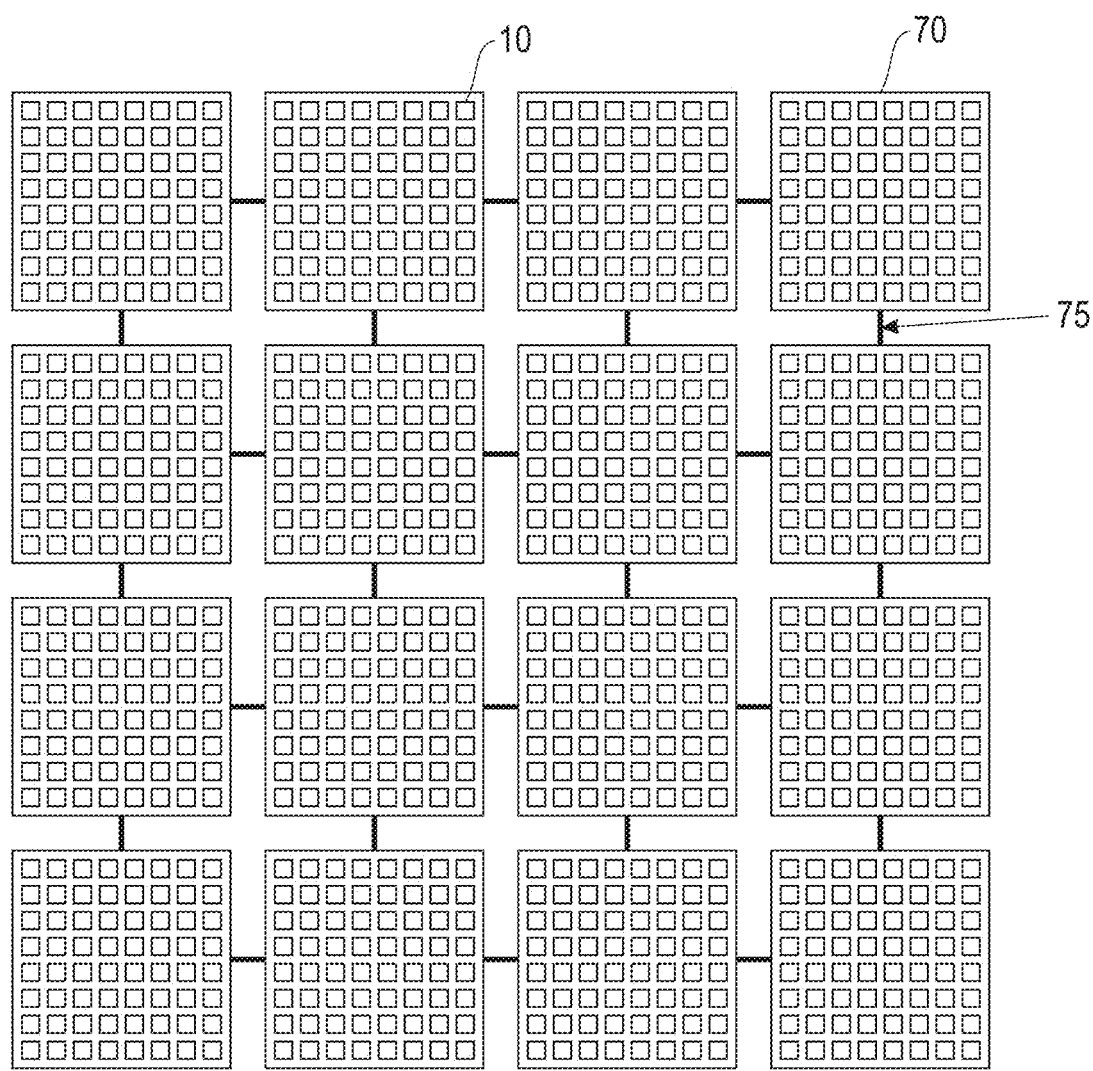
FIG. 2 illustrates a neurosynaptic network, in accordance with an embodiment of the invention.

FIG. 2 illustrates an example neural network 50, in accordance with an embodiment of the invention. The neural network 50 is a scalable neuromorphic and synaptronic architecture. The neural network 50 includes multiple chip structures 70. Each chip structure 70 comprises multiple cores 10. An event routing system 75 of the neural network 50 routes firings events between cores 10 of the chip structures 70. A core 10 of the neural network 50 may send firing events to, and receive firing events from, a different core 10 of the same chip structure 70 or a different chip structure 70.

Figure 3:
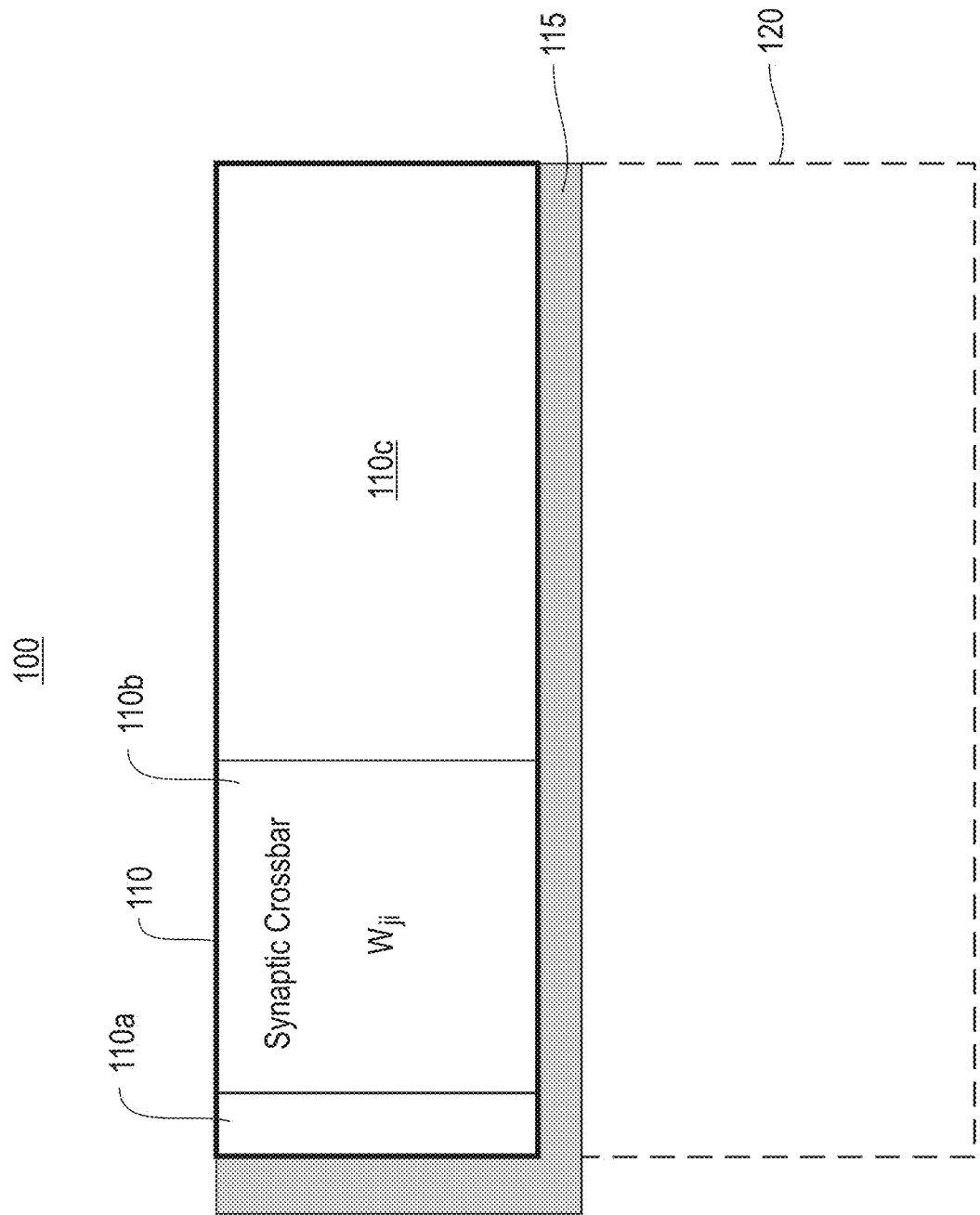
FIG. 3 illustrates a multiplexed neural core circuit, in accordance with an embodiment of the invention.

FIG. 3 illustrates a multiplexed neural core circuit 100, in accordance with an embodiment of the invention. The core circuit 100 is a multiplexed neurosynaptic core circuit because it includes one or more memories that maintain neuronal attributes for multiple neurons 11. Further, the core circuit 100 multiplexes one or more of computation and control logic for multiple neurons 11. The core circuit 100 includes a memory 110 storing information for the neural core circuit, a controller (i.e., a processing and computation logic circuit) 120 for the memory device 110, and a memory interface circuit 115. The circuit 115 may be a standard memory interface circuit. The memory 110 is shown to include a memory 110a, synaptic crossbar or interconnection network 110b, and memory 110c.

The synaptic crossbar or interconnection network 110b may maintain synaptic connectivity information for multiple neurons 11, thereby comprising multiple electronic synapses interconnecting electronic axons of the neural core circuit 100 to the electronic neurons of the neural core circuit 100. Each synapse of the interconnection network 110b interconnects an electronic axon to an electronic neuron.

Various additional memory sub-components store information for the neural core circuit 100. Specifically, the core circuit 100 includes a memory 110a, and a memory 110c, each of which store information for the neural core circuit. Further, the memory 110a may be divided into T partitions. Each of the T partitions may be associated with a corresponding one of T sub-timesteps of a timestep. The memory 110c stores additional information for the neural core circuit 100. In one embodiment, the additional information includes neuronal attributes shared across two or more of the T sub-timesteps of the timestep. For example, the memory 110c may maintain neuron parameters for the neurons 11, routing data information for the neurons 11, etc., as discussed in more detail below.

In one embodiment, the 110 may include multiple entries or rows. For example, the synaptic crossbar 110b and the memory 110c may include multiple entries, where each entry maintains neuronal attributes for a neuron 11. In one embodiment, each entry maintains the following neuronal attributes for a neuron 11: synaptic connectivity information ($W_{ij}$), neuron parameters, and routing information. In one embodiment, a first subset of each entry maintains synaptic weights of synapses 31 interconnecting a neuron 11 to axons 15.

In one embodiment, the controller 120 comprises an input processing fabric and a computation fabric. For each entry, the processing fabric is configured to receive and process firing events targeting said entry. For example, each firing event received may target an axon 15 that a neuron 11 represented by said entry is interconnected to. As indicated above, a first subset of each entry maintains synaptic weights of synapses 31 interconnecting a neuron 11 to axons 15. If the synapse 31 interconnecting the targeted axon 15 and the neuron 11 represented by said entry is conducting, said firing event may be integrated by the computation fabric. In one embodiment, the processing fabric comprises a decoder, a scheduler control unit, a scheduler, an axon type register, a multiplexing control unit, and a dot product module.

In a neural network comprising multiple core circuits 100, firing events are routed between core circuits 100 of the neural network in the form of spike event packets. Each spike event packet may include a firing event or spike event encoded as a binary address representing a target axon 15, where the firing event was generated by a neuron 11 in the same core circuit 100 or a different core circuit 100. Each spike event packet may further include a timestep and a sub-timestep indicating when a firing event encapsulated in said spike event packet was generated. A decoder of each core circuit 100 may be configured for receiving and decoding spike event packets.

In one embodiment, the scheduler is configured to manage axon buffering, and the memory 110*a* includes an axon buffer associated with the axons 15 of the core circuit 100. In other words, the memory 110*a* of the core circuit 100 may comprise a set of A axon buffers, where A is the number of axons of the core circuit 100. For a given axon 15, the scheduler may buffer received firing events addressed to the axon 15 in a buffer associated with the axon 15. Further, where each timestep has been divided into T sub-timesteps, the buffer associated with the axon may be sub-divided based on T and a depth of the memory 110*a*, as described in more detail below.

At the beginning of each sub-timestep, the scheduler may shift the firing events in the axon buffers. In one embodiment, at the beginning of each sub-timestep, a vector indicating all active axons 15 in the current sub-timestep may read from the scheduler as a row.

The contents of the memory 110 may be read and written once per sub-timestep. Specifically, for each sub-timestep, entries of the memory 110 are sequentially read out one at a time using a sequential scanner. For each entry representing a neuron 11, a dot product may be computed between the vector of active axons 15 in the current sub-timestep and the synaptic connectivity information maintained in said entry, i.e., the synaptic weights of all synapses 31 the dendrite path 34 of the neuron 11 is connected to ($W_j$).

For each entry, a multiplexer may use information to select a neuron parameter (i.e., Syn0, Syn1, Syn2, Lk). For example, the leak rate Lk maintained in said entry may be selected after all spikes are integrated. An adder may add the neuron parameter selected by the multiplexer to a membrane potential variable selected by another multiplexer. For each entry, the other multiplexer may select the membrane potential variable V maintained in said entry for the first addition. For each entry, the other multiplexer may select a modified membrane potential variable for subsequent additions, wherein the modified membrane potential variable is a temporary variable.

For each entry, after all spikes are integrated and the leak rate is applied, a comparator may determine whether the modified membrane potential variable exceeds a threshold parameter Th maintained in said entry. If the threshold parameter Th is exceeded, the encoder may generate a spike, and encapsulate/encode the generated spike into a spike event packet. The membrane potential variable V may be reset to zero before it is written back to said entry.

In some embodiments, which are illustrated below, the memory 110 may be allocated such that the memory 110 includes a first memory, a second memory, a third memory, etc. For example, the memory 110 may include multiple memory arrays, wherein a first memory array maintains synaptic connectivity information for multiple neurons 11 (i.e., a synaptic crossbar), a second memory array maintains neuron parameters for the neurons 11, a third memory array comprises axon buffers, and a fourth memory array maintains routing data information for the neurons 11.

Figure 4:
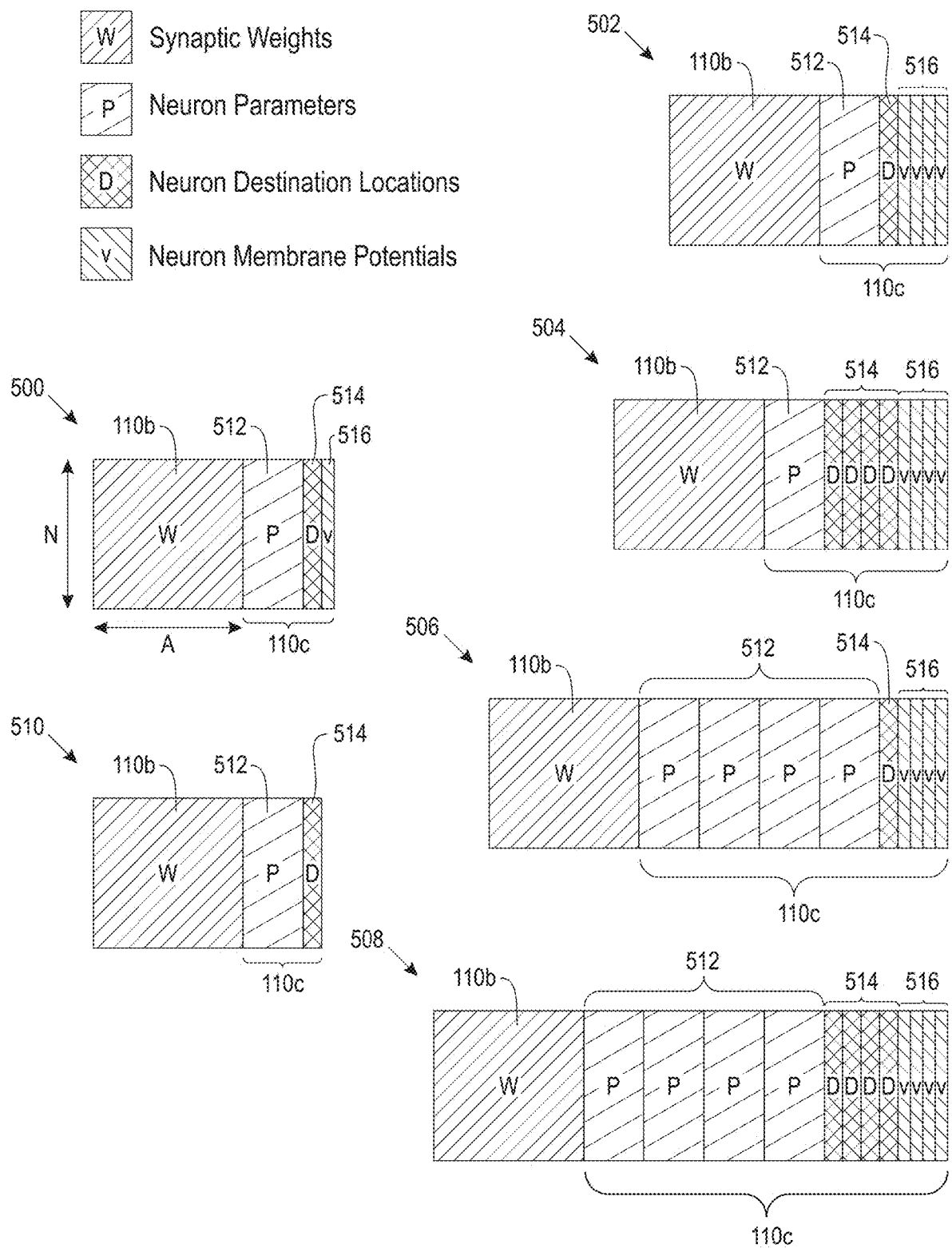
FIG. 4 illustrates plurality of potential memory configurations of a multiplexed neural core circuit, in accordance with an embodiment of the invention.

For example, referring now to FIG. 4, a plurality of potential memory configurations of a multiplexed neural core circuit are shown, in accordance with various embodiments. As an option, the memory configurations may be implemented in conjunction with features from any other embodiment listed herein, such as those described with reference to the other FIGS. Of course, however, such memory configurations and others presented herein may be used in various applications and/or in permutations which may or may not be specifically described in the illustrative embodiments listed herein. Further, the memory configurations presented herein may be used in any desired environment.

In one embodiment, memory configuration 500 includes synaptic crossbar 110*b*, and memory 110*c*, where memory 110*c* has been allocated such that it includes neuron parameters 512, neuron destination locations 514, and neuron membrane potentials 516. The synaptic crossbar 110*b* stores the synaptic weights of the synapses 31 of the core 10 in a weight matrix W. As noted above, an element $W_{ij}$ of the matrix W represents a synaptic weight of a synapse 31 located at a row/axon path i and a column/dendrite path j of the crossbar. As an option, the neuron parameters 512 of the memory configuration 500 may include, for each neuron 11 connected to the synaptic crossbar 110*b*, one or more of: spike threshold (Th), leak rate (Lk), and weights of each possible axon type (Syn0, Syn1, Syn2). Further, the neuron destination locations 514 of the memory configuration 500 may include, for each neuron 11 connected to the synaptic crossbar 110*b*, a destination axon or target axon of the neuron 11. Still yet, the neuron membrane potentials 516 of the memory configuration 500 may include, for each neuron 11 connected to the synaptic crossbar 110*b*, a membrane potential variable (V), where the membrane potential includes a single or multi-bit state that increases when inputs from source excitatory neurons are received, and decreases when inputs from source inhibitory neurons are received.

As illustrated by configuration 500, the neural core circuit 100 may be configured to operate with a time-division factor of 1 (T=1), such that each timestep includes only a single sub-timestep. In other words, neural parameters, neuron destination locations, and neuron membrane potentials are not shared between two more sub-timesteps.

In various embodiments, a size of the synaptic crossbar 110*b* and the memory 110*c* may depend on a number of axons and neurons in the neurosynaptic core (A×N), as well as the number neuron parameters, neuron destination locations, and neuron membrane potentials that are stored. For example, in one embodiment, where the neurosynaptic core comprises an array of 256 axons×256 neurons, the synaptic crossbar 110*b* may comprise a 256 bit×256 bit allocation of memory. Further, in such an embodiment, the memory configuration 500 may be organized such that the neuron parameters 512 comprise a 256 bit×102 bit array of memory, the neuron destination locations 514 comprise a 256 bit×32 bit array of memory, and the neuron membrane potentials 516 comprise a 256 bit×20 bit array of memory. Accordingly, in such an embodiment, the synaptic crossbar 110*b* and memory 110*c* of the memory configuration 500 together comprise a 256 bit×410 bit array of memory.

In another embodiment, memory configuration 502 includes the synaptic crossbar 110*b*, and memory 110*c*, where memory 110*c* has been allocated such that it includes neuron parameters 512, neuron destination locations 514, and T sets of neuron membrane potentials 516. The T sets of neuron membrane potentials 516 comprise neuron membrane potentials for the of electronic neurons of a neural core circuit 100 such that each of the T partitions stores neuron membrane potentials for the plurality of electronic neurons for one of the T sub-timesteps.

As shown in FIG. 4, T=4, such that the configuration 502 includes four sets of neuron membrane potentials 516 for four sub-timesteps of a timestep, but it is understood that T may equal any number. For example, in other embodiments, T can equal 2, 8, 16, 64, etc. In the memory configuration 502, the synaptic weights of the synaptic crossbar 110b, the neuron parameters 512, and the neuron destination locations 514 may be shared across the T sub-timesteps, while each of the T sub-timesteps is associated with a different set of the neuron membrane potentials 516. According, the memory configuration 502 allows a single neural core circuit to be time multiplexed for T sub-timesteps of a timestep in a manner wherein the synaptic weights, the neuron parameters, and the neuron destination locations are shared across the sub-timesteps, but each sub-timestep is associated with a different set of neuron membrane potentials 516. This may allow a single physical core 10 to operate as four cores during a timestep, with each of the four simulated core having its own unique neuron membrane potentials.

As noted above, in one embodiment the synaptic crossbar 110b may comprise a 256 bit×256 bit allocation of memory. Further, the memory configuration 502 may be configured such that the neuron parameters comprise a 256 bit×102 bit array of memory, the neuron destination locations 514 comprise a 256 bit×32 bit array of memory, and the T sets of neuron membrane potentials 516 comprise T(256 bit×20 bit) arrays of memory. Accordingly, where T=4, the synaptic crossbar 110b and memory 110c of the memory configuration 502 together comprise a 256 bit×(256+102+32+T(20)) bit, or 256 bit×470 bit array of memory. A neural core circuit 100 configured to include the memory configuration 502 is capable of performing in a single timestep the same number of spike computations as four separate neural core circuits 100 with the same synaptic weights, neuron parameters, and neuron destination locations, but different neuron membrane potentials tracked for each sub-timestep.

In yet another embodiment, memory configuration 504 includes the synaptic crossbar 110b, and memory 110c, where memory 110c has been allocated such that it includes neuron parameters 512, T sets of neuron destination locations 514, and T sets of neuron membrane potentials 516. The T sets of neuron destination locations 514 comprise neuron destination locations for the plurality of electronic neurons of a neural core circuit 100 such that each of the T partitions stores neuron destination for the plurality of electronic neurons for one of the T sub-timesteps. Additionally, the T sets of neuron membrane potentials 516 comprise neuron membrane potentials for the plurality of electronic neurons of a neural core circuit 100 such that each of the T partitions stores neuron membrane potentials for the plurality of electronic neurons for one of the T sub-timesteps.

As shown in FIG. 4, T=4, such that the configuration 504 includes four sets of neuron destination locations 514 and four sets of neuron membrane potentials 516 for four sub-timesteps of a timestep, but it is understood that T may equal any number. For example, in other embodiments, T can equal 2, 8, 16, 64, etc. In the memory configuration 504, the synaptic weights of the synaptic crossbar 110b and the neuron parameters 512, may be shared across the T sub-timesteps, while each of the T sub-timesteps is associated with a different set of the neuron destination locations 514 and a different set of the neuron membrane potentials 516. According, the memory configuration 504 allows a single neural core circuit to be time multiplexed for T sub-timesteps of a timestep in a manner wherein the synaptic weights and the neuron parameters 512 are shared across the sub-timesteps, but each sub-timestep is associated with a different set of neuron destination locations 514 and a different set of neuron membrane potentials 516. This may allow a single physical core 10 to operate as four cores during a timestep, with each of the four simulated core having its own unique neuron destination locations and neuron membrane potentials.

As noted above, in one embodiment the synaptic crossbar 110b may comprise a 256 bit×256 bit allocation of memory. Further, in such an embodiment, the memory configuration 504 may be configured such that the neuron parameters 512 comprise a 256 bit×102 bit array of memory, the T sets of neuron destination locations 514 comprise T(256 bit×32 bit) arrays of memory, and the T sets of neuron membrane potentials 516 comprise T(256 bit×20 bit) arrays of memory.

Accordingly, where T=4, the synaptic crossbar 110b and memory 110c of the memory configuration 504 together comprise a 256 bit×(256+102+T(32+20))bit, or a 256 bit× 566 bit array of memory. A neural core circuit 100 configured to include the memory configuration 504 is capable of performing in a single timestep the same number of spike computations as four separate neural core circuits 100 with the same synaptic weights and neuron parameters, but different neuron destination locations and different neuron membrane potentials tracked for each sub-timestep.

In another embodiment, memory configuration 506 includes the synaptic crossbar 110b, and memory 110c, where memory 110c has been allocated such that it includes T sets of neuron parameters 512, neuron destination locations 514, and T sets of neuron membrane potentials 516. The T sets of neuron parameters 512 comprise neuron parameters for the plurality of electronic neurons of a neural core circuit 100 such that each of the T partitions stores neuron parameters for the plurality of electronic neurons for one of the T sub-timesteps. Additionally, the T sets of neuron membrane potentials 516 comprise neuron membrane potentials for the plurality of electronic neurons of a neural core circuit 100 such that each of the T partitions stores neuron membrane potentials for the plurality of electronic neurons for one of the T sub-timesteps.

As shown in FIG. 4, T=4, such that the configuration 506 includes four sets of neuron parameters 512 and four sets of neuron membrane potentials 516 for 4 sub-timesteps of a timestep, but it is understood that T may equal any numbers. For example, in other embodiments, T can equal 2, 8, 16, 64, etc. In the memory configuration 506, the synaptic weights of the synaptic crossbar 110b and the neuron destination locations 514 may be shared across the T sub-timesteps, while each of the T sub-timesteps is associated with a different set of the neuron parameters 512 and a different set of the neuron membrane potentials 516. According, the memory configuration 506 allows a single neural core circuit to be time multiplexed for T sub-timesteps of a timestep in a manner wherein the synaptic weights and the neuron destination locations are shared across the sub-timesteps, but each sub-timestep is associated with a different set of the neuron parameters 512 and a different set of neuron membrane potentials 516.

As noted above, in one embodiment the synaptic crossbar 110b may comprise a 256 bit×256 bit allocation of memory. Further, in such an embodiment, the memory configuration 506 may be configured such that the T sets of neuron parameters 512 comprise T(256 bit×102 bit) arrays of memory, the neuron destination locations 514 comprise a 256 bit×32 bit array of memory, and the T sets of neuron membrane potentials 516 comprise T(256 bit×20 bit) arrays of memory. Accordingly, where T=4, the synaptic crossbar 110b and memory 110c of the memory configuration 506 together comprise a 256 bit×(256+32+T(102+20))bit, or a 256 bit×776 bit array of memory. A neural core circuit 100 configured to include the memory configuration 506 is capable of performing in a single timestep the same number of spike computations as four separate neural core circuits 100 with the same synaptic weights and neuron destination locations, but different neuron parameters and different neuron membrane potentials tracked for each sub-timestep.

In yet another embodiment, memory configuration 508 includes the synaptic crossbar 110b, and memory 110c, where memory 110c has been allocated such that it includes T sets of neuron parameters 512, T sets of neuron destination locations 514, and T sets of neuron membrane potentials 516.

As shown in FIG. 4, T=4, such that the configuration 508 includes four sets of neuron parameters 512, four sets of neuron destination locations 514, and four sets of neuron membrane potentials 516 for four sub-timesteps of a timestep, but it is understood that T may equal any numbers. For example, in other embodiments, T can equal 2, 8, 16, 64, etc. In the memory configuration 508, the synaptic weights of the synaptic crossbar 110b may be shared across the T sub-timesteps. However, each of the T sub-timesteps is associated with a different set of the neuron parameters 512, a different set of the neuron destination locations 514, and a different set of the neuron membrane potentials 516. Accordingly, the memory configuration 508 allows a single neural core circuit to be time multiplexed for T sub-timesteps of a timestep in a manner wherein the synaptic weights are shared across the sub-timesteps, but each sub-timestep is associated with a different set of the neuron parameters 512, a different set of the neuron destination locations 514, and a different set of neuron membrane potentials 516.

As noted above, in one embodiment the synaptic crossbar 110b may comprise a 256 bit×256 bit allocation of memory. Further, in such an embodiment, the memory configuration 508 may be configured such that the T sets of neuron parameters 512 comprise T(256 bit×102 bit) arrays of memory, the T sets of neuron destination locations 514 comprise T(256 bit×32 bit) arrays of memory, and the T sets of neuron membrane potentials 516 comprise T(256 bit×20 bit) arrays of memory. Accordingly, where T=4, the synaptic crossbar 110b and memory 110c of the memory configuration 508 together comprise a 256 bit×(256+T(102+32+20)) bit, or a 256 bit×872 bit array of memory. A neural core circuit 100 configured to include the memory configuration 508 is capable of performing in a single timestep the same number of spike computations as four separate neural core circuits 100 with the same synaptic weights, but different neuron parameters, different neuron destination locations, and different neuron membrane potentials tracked for each sub-timestep.

In yet another embodiment, memory configuration 510 includes the synaptic crossbar 110b, and the memory 110c, where the memory 110c has been allocated such that it includes neuron parameters 512 and neuron destination locations 514. In the memory configuration 510, the memory 110 has been configured such that synaptic weights, the neuron parameters 512, and neuron destination locations 514 are shared across the sub-timesteps of a timestep, and neuron membrane potentials are not tracked. In a neural core circuit 100 implementing the memory configuration 510, neuron membrane potentials are not stored. As a result, neurons of such a neural core circuit 100 may spike whenever input is received at a connected axon, without comparison of membrane potential to a threshold.

In view of the herein described memory configurations 500-510 of FIG. 4, it should be understood that a neural core circuit 100 may be configured into any combination of N neuron states or N×T neuron states, N membrane potentials or N×T membrane potentials, N neuron parameters or N×T neuron parameters, and N neuron destination locations or N×T neuron destination locations, where N is the number of neurons of the neural core circuit 100, and T is a time-division factor (i.e., the total number of sub-timesteps). Moreover, in each of the memory configurations 500-510 of FIG. 4, the interconnection network or synaptic crossbar 110b stores synaptic weights that are shared by the electronic neurons 11 of the neural core circuit 100 across the T sub-timesteps. Still yet, in each of the memory configurations 500-510 of FIG. 4, the neural core circuit 100 may include a memory for axon buffering, wherein each axon is associated with an axon buffer partitioned or organized based on T.

Figure 5A:
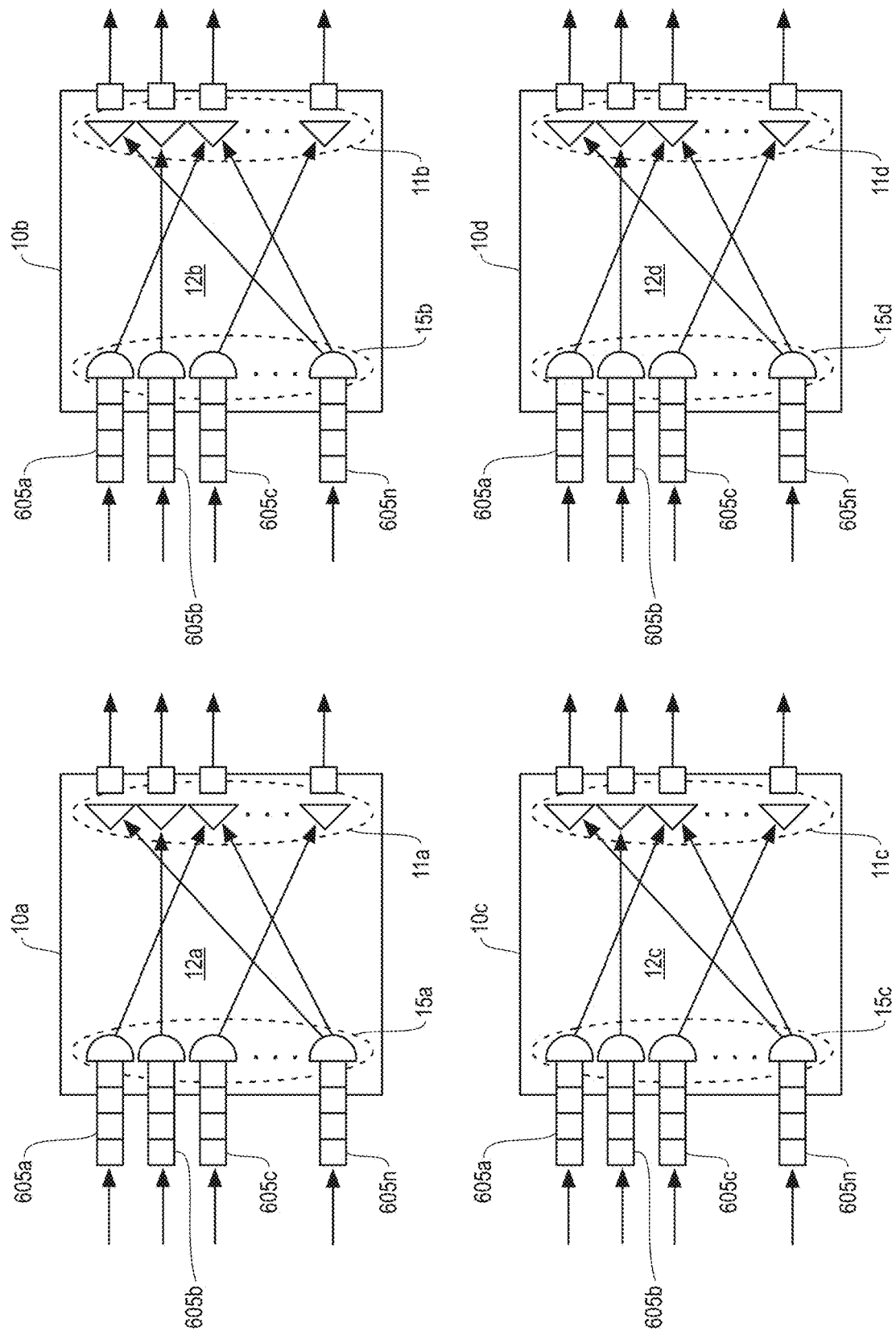
FIGS. 5A-5C illustrate the efficiencies of a multiplexed neurosynaptic core, in accordance with one embodiment.
Figure 5B:
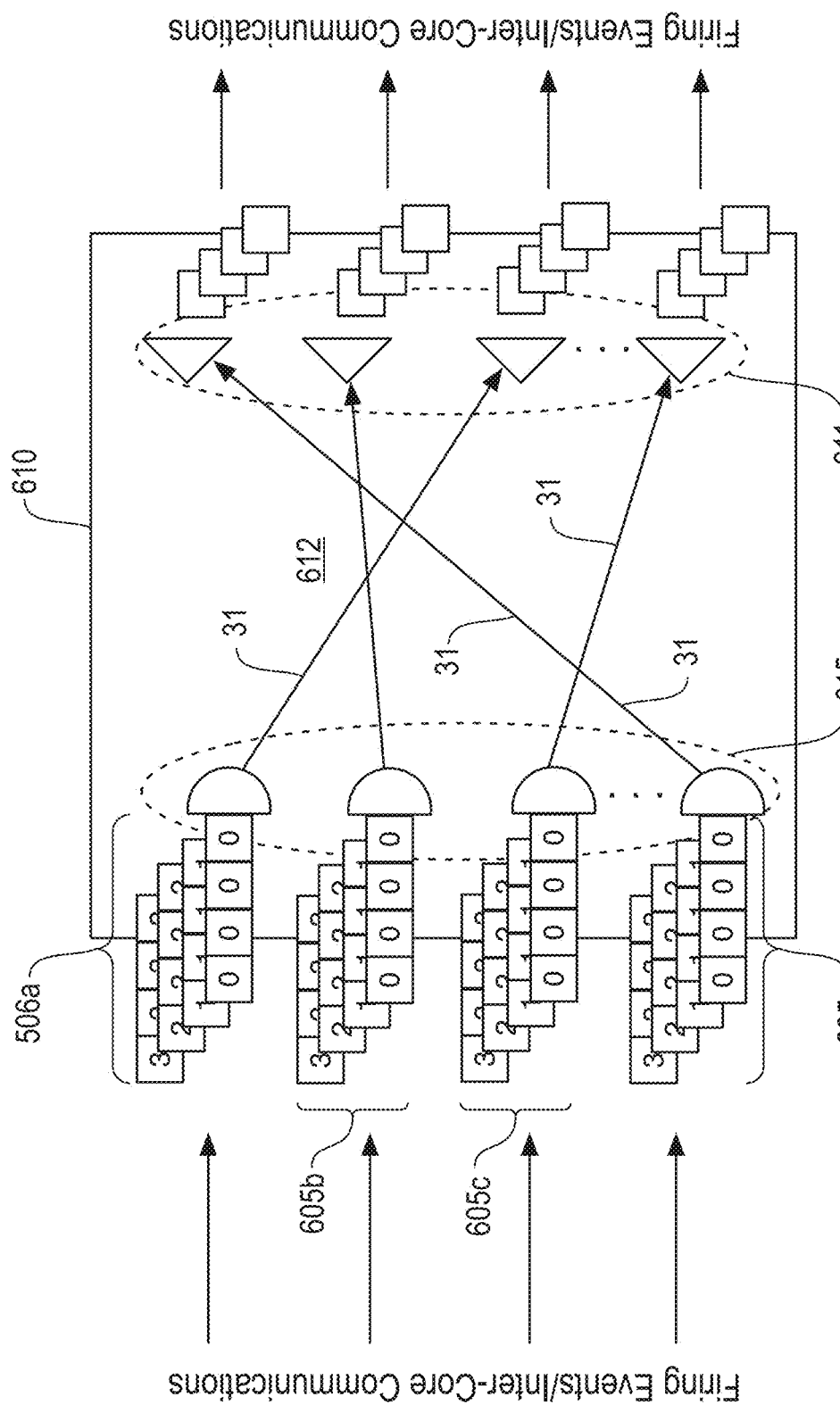
Figure 5C:
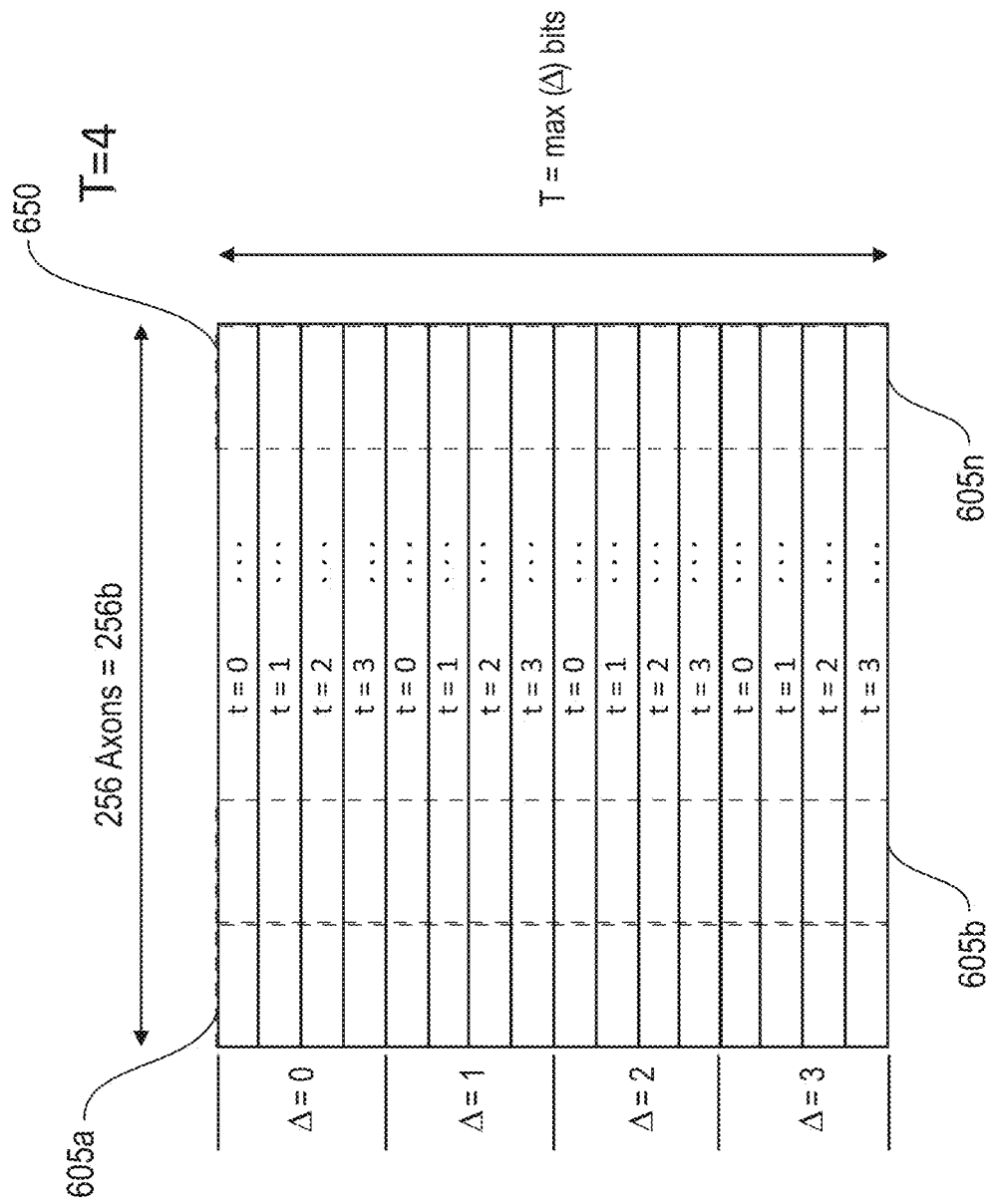

FIGS. 5A-5C illustrate the efficiencies of a multiplexed neurosynaptic core module 610, in accordance with one embodiment. As an option, the multiplexed neurosynaptic core module may be implemented in conjunction with features from any other embodiment listed herein, such as those described with reference to the other FIGS. Of course, however, such multiplexed neurosynaptic core module 610 and others presented herein may be used in various applications and/or in permutations which may or may not be specifically described in the illustrative embodiments listed herein. Further, the multiplexed neurosynaptic core module 610 presented herein may be used in any desired environment.

Referring now to FIG. 5A, four neurosynaptic core modules 10 (10a, 10b, 10c, and 10d) are shown to be operating independently in a non-multiplexed manner. In one embodiment, the four neurosynaptic core modules 10 may all be located on the same chip, such as a chip structure 70 described in the context of FIG. 2. Further, each of the cores 10 are shown to include a plurality axons 15. In particular, the core 10a includes the axons 15a, the core 10b includes the axons 15b, the core 10c includes the axons 15c, and the core 10d includes the axons 15d. Similarly, each of the cores 10 are shown to include a plurality neurons 11. In particular, the core 10a includes the neurons 11a, the core 10b includes the neurons 11b, the core 10c includes the neurons 11c, and the core 10d includes the neurons 11d. Further, each axon 15 of FIG. 5A is shown to be in communication with an independent axon buffer 605 (e.g., axon buffers 605a, 605b, 605c, . . . 605n), such that each core 10 includes the same number of axon buffers 605 as axons 15.

As illustrated in FIG. 5A, the synaptic crossbars 12a-12d of the cores 10a-10d, respectively, have been configured in the same manner. In other words, the respective synapses of the cores 10a-10d have been configured such that the matrix W and the elements Wij of the matrix W are the same for each of the cores 10a-10d. Accordingly, a spike event received for any given axon of the core 10a will cause the core 10a to output the spike event that would be output by any of the cores 10b-10d if one of the corresponding axons of one of the cores 10b-10d were to receive the spike event.

Referring now to FIG. 5B, a multiplexed neurosynaptic core module (or "core") 610 is illustrated, according to one embodiment. The multiplexed core 610 includes a plurality of electronic axons 615 in communication with a plurality of electronic neurons 611. Each of the axons 615 may be selectively coupled to one or more of the neurons 611 via synapses of a synaptic crossbar 612 of the multiplexed core 610. Further, the synaptic crossbar 612 of the multiplexed core 610 is shown to be configured in the same manner as the synaptic crossbars 12a-12d of cores 10a-10d, respectively, of FIG. 5A. In other words, the respective synapses of the multiplexed core 610 have been configured such that the matrix W and the elements $W_{ij}$ of the matrix W are the same for each of the cores 10a-10d.

Still yet, as shown in FIG. 5B, a single axon buffer 605 may buffer the firing events previously stored in four corresponding axon buffers 605 of FIG. 5A. For example, the axon buffer 605a of the multiplexed core 610 buffers the firing events that would be stored by the four different axon buffers 605a of the cores 10a-10d of FIG. 5A. Similarly, the axon buffer 605b of the multiplexed core 610 buffers the firing events that would be stored by the four different axon buffers 605b of the cores 10a-10d of FIG. 5A, etc. With respect to a given axon 615, the axon buffer 605 may be configured/read in a fashion that interleaves the firing events of the different sub-timesteps of a given timestep.

For example, with reference to FIG. 5B, the firing events buffered in axon buffers 605 have been identified as being associated with one of four sub-timesteps (i.e., sub-timestep 0, sub-timestep 1, sub-timestep 2, or sub-timestep 3) of four different timesteps (i.e., each of the buffers 605 is four units wide, one for each timestep). During operation of the multiplexed core 610, a first event in the axon buffer 605a associated with sub-timestep 0 may be operated on, then a first event in the axon buffer 605a associated with sub-timestep 1 may be operated on, then first event in the axon buffer 605a associated with sub-timestep 2 may be operated on, then a first event in the axon buffer 605a associated with sub-timestep 3 may be operated on, and then a first event in the axon buffer 605a (after shifting) associated with sub-timestep 0 of another timestep may be operated on, etc.

As illustrated by FIG. 5C, a memory 650 may comprise the axon buffers 605 associated with each of the axons 615 of the multiplexed core 610. The memory 650 may be substantially identical to the memory 110a described previously in the context of FIG. 3. A width of the memory 650 may be dependent upon the size of the core for which the memory 650 stores information. In one embodiment, the memory 650 is 256 bit wide for buffering 256 axons of the multiplexed core 610. The number of timesteps (Δ)/sub-timesteps for which the memory 650 stores information may be dependent on a height of the memory 650. For example, the memory 650 has a height of (T×max(Δ)) bits, where Δ is a number of timesteps, and T is a time-division factor. As shown, the memory 650 buffers T sub-timesteps for each of Δ timesteps. Accordingly, each row of the memory 650 is associated with a single sub-timestep, and each 1 bit-wide column of the memory 650 is associated with a single axon. In this manner, the memory 650 may comprise an axon buffer memory that is divided into T×max(Δ) rows, wherein max(Δ) is a maximum number of timesteps.

Thus, for a given size of the memory 650, T and max(Δ) are directly related. For example, a memory 650 with a depth or height of 128 rows, may be configured such that T=64, and max(Δ)=2; T=32, and max(Δ)=4; T=16, and max(Δ)=8; T=8, and max(Δ)=16; T=4, and max(Δ)=32; T=2, and max(Δ)=64; or T=1, and max(Δ)=128.

In one embodiment, the multiplexed neurosynaptic multiplexed core 610 may operate in the following manner. Synchronously, within each of T sub-timesteps (from sub-timestep 0 to sub-timestep T−1), each axon it is checked to determine whether the axon has a spike that needs to be delivered. If the axon has a spike that needs to be delivered, then, for every neuron $j_t$, update a state of the neuron as a function of synaptic weight $s_{ij}$. After each axon has been checked to determine whether the axons have spikes to be delivered, then, for every neuron $j_t$, compute its new neuron state as a function of its previous state, its parameters, and its input; and then check if the neuron has spiked. If a given neuron has spiked, then look up the destination location of the neuron, generate a spike event packet addressed to the destination location, send the spike event packet on the neurosynaptic network, and reset the state of neuron $j_t$. Further, the multiplexed neurosynaptic core 610 may operate asynchronously to receive spike event packets from the neurosynaptic network, and update axon buffers.

In another embodiment, the multiplexed neurosynaptic core 610 may operate in the following manner. Synchronously, within each of T sub-timesteps (from sub-timestep 0 to sub-timestep T−1), for every neuron j, read a state of the neuron j, neuron parameters of the neuron j, and a destination location of the neuron j. Next, add the parallel sum off synaptic inputs (from axons connected to the neuron) to the previous state to determine a new neuron state. Where $n_0$ is the previous neuron state, $n_1$ is the new neuron state, g is axon_type_id, A is the axon buffer, k is the number of axon types, and w is the weight associated with axon type k on neuron j, this may be computed as $$n_1 = n_0 + \sum_k \left( w_{jk} \sum_{i=0}^{size(A)} A_i \times s_{ij} \times (g_i == k) \right).$$

Next, it is checked whether the new neuron state triggers a spike. If the new neuron state triggers a spike, then look up the destination location of the neuron, generate a spike event packet addressed to the destination location, send the spike event packet on the neurosynaptic network, and reset the state of the neuron j. In such an embodiment, the multiplexed neurosynaptic core 610 may operate asynchronously to receive spike event packets from the neurosynaptic network, and update axon buffers.

By sharing one or more neuron attributes or parameters, repeated networks of neurons and axons that are found on a neurosynaptic chip may be localized to a smaller number of the cores on the chip. As a result, a given collection of neurosynaptic computations may require less physical space on a neurosynaptic chip and/or less power than non-multiplexed cores.

To achieve faster operation of neurosynaptic core circuits, neuron updates may be parallelized via, for example, dedicated multipliers. The axon buffers may be utilized due to time stamp and/or time delays.

As a result of multiplexing the neurosynaptic cores of a chip, one chip may be able to scale the boundary between mobility and scalability, while achieving the extremes of area and power efficiency, and while trading between the two along the way. Further, multiplexed neurosynaptic cores provide the ability to mix-and-match space-invariant and space-variant kernels in a homogeneous architecture, and allow a given chip to be optimized for a given power budget, without wasting dynamic energy if no work needs to be done. However, if the optimization metric is speed of operation (throughput, latency, etc.), then the chip may be optimized for the necessary speed with a minimum resource allocation, or minimal power consumption (assuming the specified speed metric is achievable in a given architecture). The chip may also me optimized for minimal resource allocation for a given application (in case multiple applications are running side by side on the same chip). Moreover, such optimizations may be performed at full chip reconfiguration phase (static optimization/reconfiguration) or using partial reconfiguration capabilities during the operational phase (dynamic optimization/reconfiguration). These concepts apply not only for the chip-level optimizations, but also for the system-wide optimizations.

Accordingly, in some embodiments a neurosynaptic network may include a plurality of multiplexed cores 610. Further, not all of the multiplexed cores 610 may be multiplexed according to the same time-division factor. For example, a first multiplexed core 610 may be multiplexed according to a first time-division factor (T), where one or more of neuron parameters, neuron destination locations, and neuron membrane potentials of the first multiplexed core 610 may be shared across T sub-timesteps of a timestep. Further, one or more of the memories storing neuron parameters, neuron destination locations, and neuron membrane potentials of the first multiplexed core 610 may divided into T partitions, where each of the T partitions is associated with a corresponding one of T sub-timesteps of the timestep. Additionally, a second multiplexed core 610 may be multiplexed according to a second time-division factor (U), where one or more of neuron parameters, neuron destination locations, and neuron membrane potentials of the second multiplexed core 610 may be shared across U sub-timesteps of the timestep. Still yet, one or more of the memories storing neuron parameters, neuron destination locations, and neuron membrane potentials of the second multiplexed core 610 may divided into U partitions, where each of the U partitions is associated with a corresponding one of U sub-timesteps of the timestep. Finally, T may be equal to, greater than, or less than U.

For example, a first multiplexed core 610 may be multiplexed by a time-division factor of 4 (T=4). Accordingly, synaptic weights, neuron parameters, and neuron destination locations may be shared across the 4 sub-timesteps of each timestep, however a memory storing neuron membrane potentials for the first multiplexed core 610 may be divided into 4 partitions, where each of the 4 partitions is associated with a corresponding one of 4 sub-timesteps of each timestep. In communication with the first multiplexed core 610 is a second multiplexed core 610, which is multiplexed by a time-division factor of 8 (U=8). For the second multiplexed core 610, synaptic weights, neuron parameters, and neuron destination locations may be shared across the 8 sub-timesteps of each timestep, however a memory storing neuron membrane potentials for the second multiplexed core 610 may be divided into 8 partitions, where each of the 8 partitions is associated with a corresponding one of 8 sub-timesteps of each timestep. Of course each of the first multiplexed core 610 and the second multiplexed core may be multiplexed by any time-division factor (e.g., 1, 2, 4, 8, 16, 32, 64, etc.).

Firing events or spike events between a first core 610 multiplexed by a first time-division factor and a second core 610 multiplexed by a second time-division factor that is different than the first time-division factor may be bridged by mapping spatially distributed inputs to sub-timesteps.

In particular, a spike event may be routed between multiplexed cores by generating, at a first multiplexed neural core that is multiplexed into T sub-timesteps of a timestep, a packet for the spike event. Further, the packet includes at least one neural core address field, the timestep, an axon address, and at least one of a timescale and an offset. The first multiplexed neural core then transmits the spike event packet for receipt of the spike event by the second neural core. The second neural core may multiplexed by a different time-division factor than the first multiplexed neural core. For example, the second neural core may be multiplexed by U sub-timesteps for each of the timesteps, where U is greater than or less than T.

In one embodiment, the at least one neural core address field of the packet may comprise a $(dx+dx_t)$ field, and/or a $(dy+dy_t)$ field. For example, the at least one neural core address field of the packet may be formatted to include $(dx+dx_t, dy+dy_t)$. As an option, $d_{x,t}$ and $d_{y,t}$ are each ceil($\log_2$ N) bits. Further, each of $dx_t$ and $dy_t$ may be programmable per core per sub-timestep. In various embodiments, the dx and dy address fields provide offsets in the X-coordinate and Y-coordinate directions of a neural network, respectively. As an option, a packet may first be routed first in the X-dimension, and then in the Y-dimension. Still yet, the axon address included in the packet may comprise an address of the electronic axon in the destination neural core to which the spike is to be delivered.

In one embodiment, the packet includes the timescale and not the offset. The timescale may be represented by a constant, F, where F is the time-division factor scale of the neural core operating a lesser time-division factor. The timescale (F) may be used when sending a spike event from a neural core operating at a greater time-division factor (a faster core) to a neural core operating a lesser time-division factor (a slower core). When the timescale (F) is included in the packet, an offset may not be included in the packet. For example, when the spike event packet is being sent from a multiplexed core where T=8 to a multiplexed core where T=4, then F=4 and the offset=0 or is not included.

Also, the $dx_t$ and $dy_t$ bits may be used when sending a spike event from a neural core operating at a greater time-division factor (a faster core) to a neural core operating a lesser time-division factor (a slower core), and the $dx_t$ and $dy_t$ bits may not be included in a packet being sent from a slower core to a faster core.

In another embodiment, the packet includes the offset and not the timescale. The offset may be represented by a constant, C, where C is an offset that maps spike events into a sub-timestep of a faster core. Thus, the offset (C) may be used when sending a spike event from a neural core operating at a lesser time-division factor (a slower core) to a neural core operating a greater time-division factor (a faster core). Further, when C is included in the packet, the timescale constant (F) may equal 0, or may not be included in the packet. In this manner, C and F are both constants that may be used to define a sub-timestep for delivering a spike event when the spike event is being transmitted between cores of different time-division factors.

For example, when a first multiplexed neural core is multiplexed by T sub-timesteps for each timestep, and a second multiplexed neural core is multiplexed by U sub-timesteps for each timestep, and T is less than U, then the packet being sent from the slower core to the faster core will include the offset (C) for mapping delivery of the spike event into a proper sub-timestep of the faster core.

In one particular embodiment, the spike event packet may be formatted as $(dx+dx_t, dy+dy_t, C+(t \% F), \Delta, axon\_address)$, where % is the modulus operator, and $\Delta$ is the timestep. Accordingly, this packet may be delivered to neural core $(dx+dx_t, dy+dy_t)$ after delay of $\Delta$ in sub-timestep $C+(t \% F)$ to an axon at axon_address.

Figure 6A:
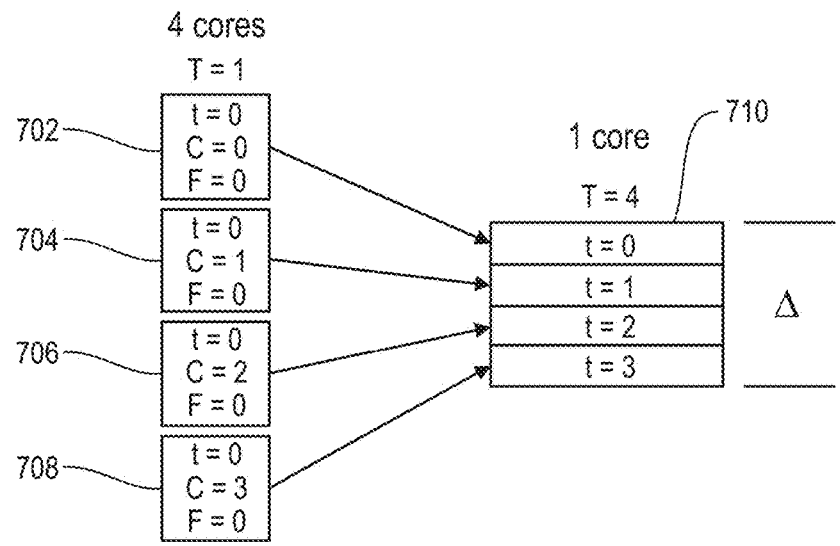
FIGS. 6A-6B illustrate the routing of spike events between multiplexed neurosynaptic cores, in accordance with one embodiment.
Figure 6B:
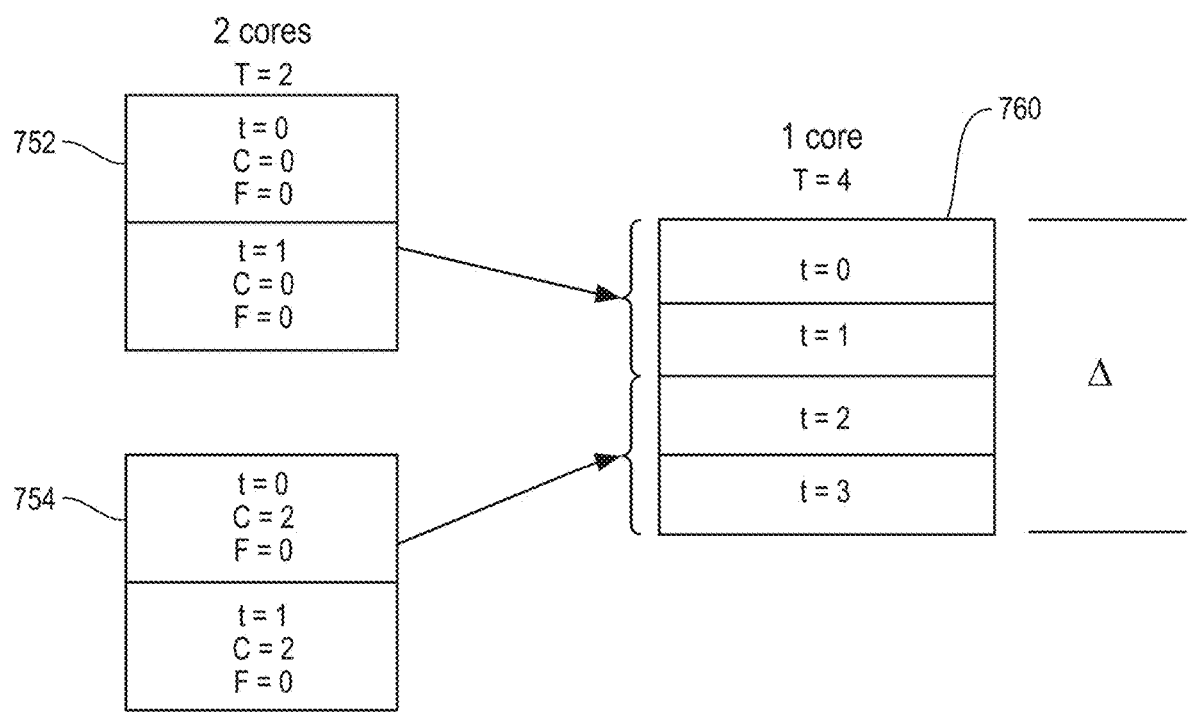

FIGS. 6A-6B depict the routing of spike events between neurosynaptic cores, in accordance with one embodiment. As an option, the routing of spike events may be implemented in conjunction with features from any other embodiment listed herein, such as those described with reference to the other FIGS. Of course, however, the systems and methods for routing spike events may be used in various applications and/or in permutations which may or may not be specifically described in the illustrative embodiments listed herein. Further, the systems and methods for routing spike events presented herein may be used in any desired environment.

Referring now to FIG. 6A, neural core circuits 702, 704, 706, and 708 are each operating with time-division factor of 1, such that each of the cores 702, 704, 706, and 708 operates once for each timestep ($\Delta$). The cores 702, 704, 706, and 708 may be convention, non-multiplexed, neurosynaptic cores. Output from the neurons of each of the cores 702, 704, 706, and 708 is configured to result in spike events (i.e., firing events) that are transmitted to a multiplexed neural core circuit 710. As depicted in FIG. 6A, the multiplexed neural core 710 is operating with time-division factor of 4 such that it operates four times per each timestep ($\Delta$).

Accordingly, to enable communication between the cores 702, 704, 706, and 708 and the multiplexed core 710, each of the cores 702, 704, 706, and 708 have been assigned a different C value. Each C value is a sub-timestep offset that maps a received spike event into a sub-timestep of a faster core (i.e., core 710). Accordingly, C=0 for the core 702, and spike events received from the core 702 are mapped into the first sub-timestep of the multiplexed core 710; C=1 for the core 704, and spike events received from the core 704 are mapped into the second sub-timestep of the multiplexed core 710; C=2 for the core 706, and spike events received from the core 706 are mapped into the third sub-timestep of the multiplexed core 710; and C=3 for the core 708, and spike events received from the core 708 are mapped into the fourth sub-timestep of the multiplexed core 710. In both FIGS. 6A and 6B, $dx_t=0$ and $dy_t=0$. Routing of the packets may be managed by event routers located between the cores.

By way of yet another example, referring now to FIG. 6B, multiplexed neural core circuits 752 and 754 are each operating with a time-division factor of 2, such that each of the cores 752 and 754 operates twice for each timestep ($\Delta$). The neurons of the cores 752 and 754 are configured to transmit spike events (i.e., firing events) to a multiplexed neural core circuit 760. As depicted in FIG. 6B, the multiplexed neural core 760 is operating with a time-division factor of 4 such that it operates four times for each timestep ($\Delta$).

Accordingly, to enable communication from the multiplexed cores 752 and 754 to the multiplexed core 760, each of the cores 752 and 754 have been assigned a different C value. Specifically, C=0 for the core 752, which results in the spike events received from the core 752 being mapped into the first two sub-timesteps (t=0, t=1) of the multiplexed core 760; and C=2 for the core 754, which results in the spike events received from the core 754 being mapped into the third and fourth sub-timesteps (t=2, t=3) of the multiplexed core 760. As a result, although the multiplexed cores 752 and 754 may both perform computations during the same period of two sub-timesteps of each time step, the spike events sent from the cores 752 and 754 are buffered and input to the multiplexed core 760 in an ordered and non-conflicting manner.

Figure 7A:
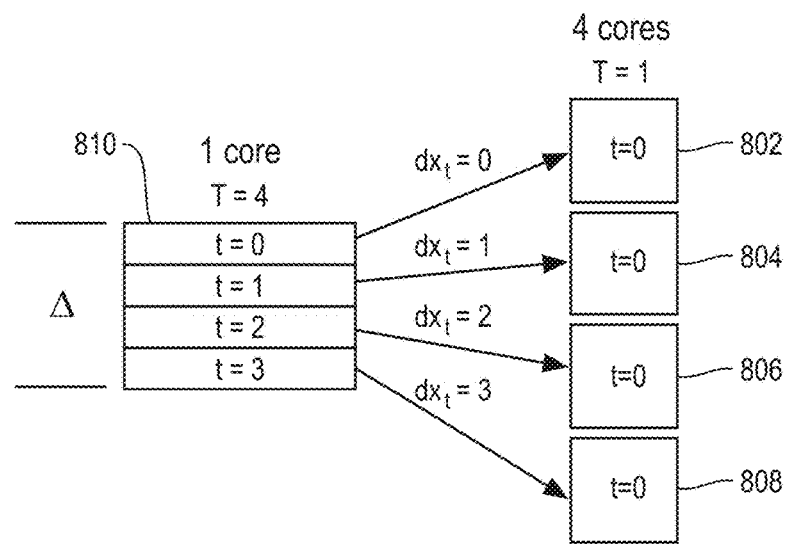
FIGS. 7A-7B illustrate the routing of spike events between multiplexed neurosynaptic cores, in accordance with one embodiment.
Figure 7B:
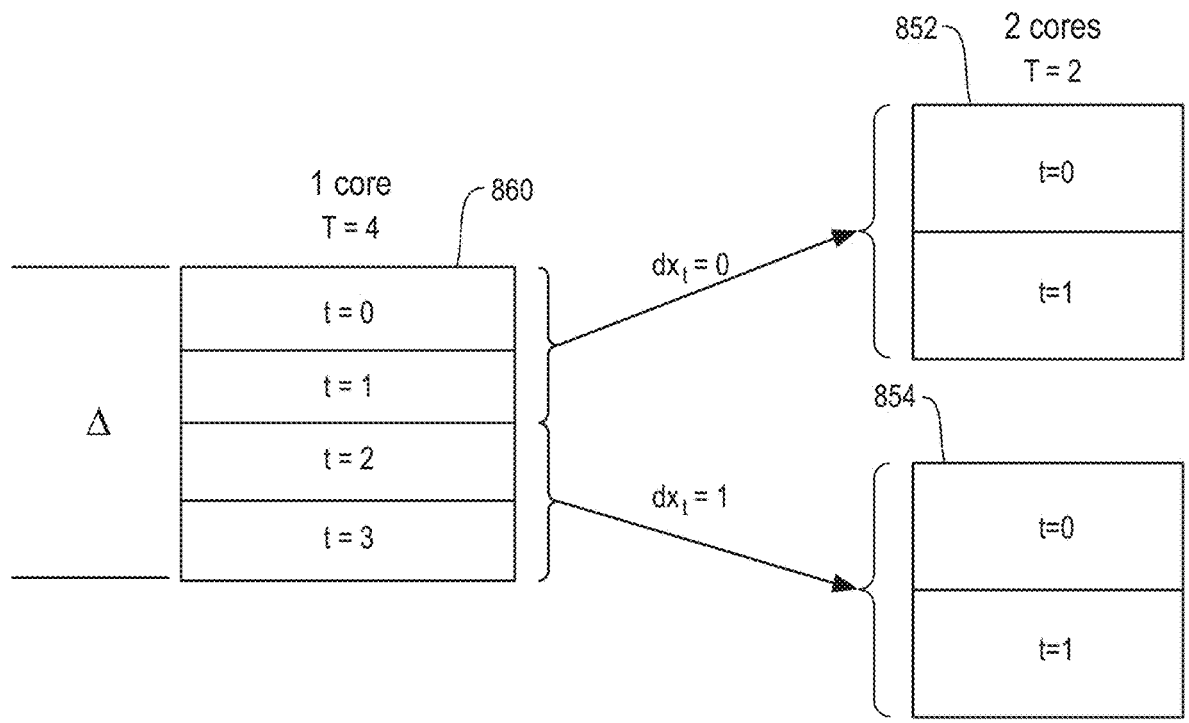

FIGS. 7A-7B depict the routing of spike events between neurosynaptic cores, in accordance with one embodiment. As an option, the routing of spike events may be implemented in conjunction with features from any other embodiment listed herein, such as those described with reference to the other FIGS. Of course, however, the systems and methods for routing spike events may be used in various applications and/or in permutations which may or may not be specifically described in the illustrative embodiments listed herein. Further, the systems and methods for routing spike events presented herein may be used in any desired environment.

Referring now to FIG. 7A, multiplexed neural core circuit 810 is operating with a time-division factor of 4 such that it operates four times per each timestep ($\Delta$). The multiplexed core 810 is shown to be transmitting spike events to each of the neural core circuits 802, 804, 806, and 808, which are each operating with time-division factor of 1. In other words, each of the cores 802, 804, 806, and 808 operates once for each timestep ($\Delta$).

Accordingly, to enable the reliable transmission of spike events from the multiplexed core 810 to the cores 802, 804, 806, and 808, the packets from the multiplexed core 810 are configured to include a C value of 0, and an F value of 1. In other words, the timescale of such packets is 1 (F=1), reflecting the time-division factor of the slower cores 802-808, and C=0 because the multiplexed core 810 is faster than the slower cores 802-808. Moreover, the spike event packets from the multiplexed core 810 to the cores 802-808 is shown to include a $dx_t$ field in the neural core address field of the packets. Specifically, $dx_t=0$ of the spike event packet from the multiplexed core 810 to the core 802, indicating that it is mapped to the first sub-timestep of each $\Delta$, $dx_t=1$ of the spike event packet from the multiplexed core 810 to the core 804, indicating that it is mapped to the second sub-timestep of each $\Delta$, $dx_t=2$ of the spike event packet from the multiplexed core 810 to the core 806, indicating that it is mapped to the third sub-timestep of each $\Delta$, and $dx_t=4$ of the spike event packet from the multiplexed core 810 to the core 808, indicating that it is mapped to the fourth sub-timestep of each $\Delta$.

As an option, $dy_t$ may be used in place of, or in addition to $dx_t$, to map a spatial distribution. Each of the receiving cores may be encoded in pairs ($dx_t$, $dy_t$) within each of the sub-time steps. The $dx_t$ and $dy_t$ values may be predetermined, such as, for example, by a programmer. The set of $\{(dx_t, dy_t), t=1, 2, \ldots, T\}$ may be a neighborhood.

Referring now to FIG. 7B, multiplexed neural core circuit 860 is operating with a time-division factor of 4 such that it operates four times per each timestep ($\Delta$). The multiplexed core 860 is shown to be transmitting spike events to each of the multiplexed neural core circuits 852 and 854, which are each operating with a time-division factor of 2. In other words, each of the cores 852 and 854 operates twice for each timestep ($\Delta$).

Accordingly, to enable the reliable transmission of spike events from the multiplexed core 860 to the cores 852 and 854, the packets from the multiplexed core 860 are configured to include a C value of 0 (C=0), and an F value of 2 (F=2). In other words, the timescale of such packets is 2 (F=2), reflecting the time-division factor of the slower cores 852 and 854 receiving the packets, and C=0 because the multiplexed core 860 is faster than the slower cores 852 and 854. Moreover, the spike event packets from the multiplexed core 860 to the multiplexed cores 852 and 854 is shown to include a $dx_t$ field in the neural core address field of the packets. Specifically, $dx_t=0$ of the spike event packet from the multiplexed core 860 to the multiplexed core 852, indicating that it is mapped to the first sub-timestep of each $\Delta$, and $dx_t=1$ of the spike event packet from the multiplexed core 860 to the multiplexed core 854, indicating that it is mapped to the second sub-timestep of each Δ.

In one embodiment, a multiplexed neural core circuit, for an integer multiplexing factor T that is greater than zero, may comprise T sets of electronic neurons T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

Additionally, in one embodiment, the synaptic interconnection network may be shared across the T sets of electronic neurons. In another embodiment, a plurality of neuron parameters may be shared across the T sets of electronic neurons. In yet another embodiment, a plurality of neuron destination locations are shared across the T sets of electronic neurons. In still another embodiment, a neuron state may be shared across the T sets of electronic neurons.

Further, in one embodiment, an operation of the multiplexed neural core circuit may be described in terms of a plurality of discrete timesteps, and within a single discrete timestep, each set of the T sets of electronic axons may be interconnected with its corresponding set of electronic neurons via the synaptic interconnection network. In another embodiment, each of the plurality of discrete timesteps may be divided into T sub-timesteps, each set of the T sets of electronic axons and its corresponding set of electronic neurons may be assigned one of the T sub-timesteps, and each set of the T sets of electronic axons may be interconnected with its corresponding set of electronic neurons via the synaptic interconnection network within their assigned one of the T sub-timesteps.

Further still, in one embodiment, the multiplexed neural core circuit may further include two distinct memory banks, there the two distinct memory banks may include a first memory bank comprising the synaptic interconnection network, a plurality of neuron parameters, a plurality of neuron destination locations, and a neuron state for all electronic neurons within the T sets of electronic neurons, as well as a second memory bank comprising an electronic axon buffer memory. In another embodiment, the electronic axon buffer memory may be divided into T rowsxmax(Δ) columns, where max(Δ) is a number of time delays.

Also, in one embodiment, a neurosynaptic system may comprise a neurosynaptic chip, a single-core neurosynaptic module as a component on a chip, or a multi-core neurosynaptic module as a component on a chip, including a plurality of multiplexed neural core circuits interconnected via an on-chip network, where each of the plurality of multiplexed neural core circuits comprises, for an integer multiplexing factor T that is greater than zero, T sets of electronic neurons, T sets of electronic axons, where each set of the T sets of electronic axons corresponds to one of the T sets of electronic neurons, and a synaptic interconnection network comprising a plurality of electronic synapses that each interconnect a single electronic axon to a single electronic neuron, where the interconnection network interconnects each set of the T sets of electronic axons to its corresponding set of electronic neurons.

In addition, in one embodiment, the neurosynaptic chip, the single-core neurosynaptic module, or the multi-core neurosynaptic module may be interconnected via an off-chip network. In another embodiment, the on-chip network may be event-driven. In another embodiment, the off-chip network may be event-driven. In yet another embodiment, one or more of the plurality of multiplexed neural core circuits may have an integer multiplexing factor different from the other multiplexed neural core circuits of the plurality of multiplexed neural core circuits.

Furthermore, in one embodiment, a first set of the plurality of multiplexed neural core circuits may have a first integer multiplexing factor T1, and the first set may connect with a second set of multiplexed neural core circuits that has a second integer multiplexing factor T2 that is different from the first integer multiplexing factor T1. In another embodiment, inter-core messages may include spike packets that encode a relative address of a destination core, an electronic axon time delay, an address of a set of electronic axons, an axon address, and information that encodes a mapping between the integer multiplexing factor Ts of source cores and the integer multiplexing factor Td of destination cores.

Figure 8:
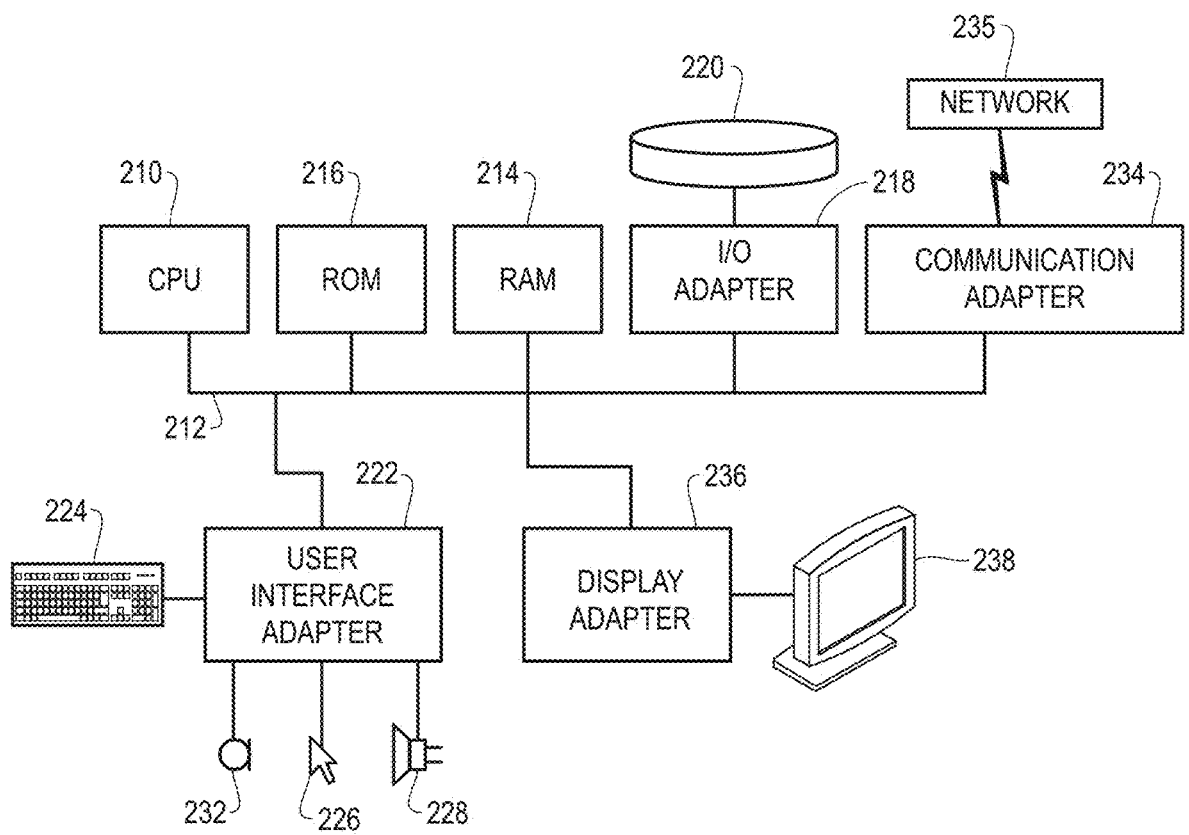
FIG. 8 illustrates a representative hardware environment for configuring a multiplexed neurosynaptic core, in accordance with one embodiment.

FIG. 8 shows a representative hardware environment for configuring neurosynaptic cores, in accordance with one embodiment. Such figure illustrates a typical hardware configuration of a workstation having a central processing unit 210, such as a microprocessor, and a number of other units interconnected via a system bus 212.

The workstation shown in FIG. 8 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multiplexed neural core circuit, comprising:
T sets of electronic neurons, where T is an integer multiplexing factor having a value of four;
T sets of electronic axons, where each set of the T sets of electronic axons corresponds to one of the T sets of electronic neurons;
a synaptic interconnection network comprising a plurality of electronic synapses that each interconnect a single electronic axon to a single electronic neuron, where the interconnection network interconnects each set of the T sets of electronic axons to its corresponding set of electronic neurons; and
a set of axon buffers divided into T partitions, where each of the T partitions is associated with one of T sub-timesteps of a timestep, and each of the T sub-timesteps includes:
a shared set of neuron parameters, the neuron parameters including a spike threshold, a leak rate, and axon type weights,
a shared set of neuron destination locations indicating a destination axon for each of the electronic neurons, and
a different set of neuron membrane potentials from the other sub-timesteps, where each set of neuron membrane potentials includes a membrane potential V that increases when inputs from source excitatory neurons are received, and decreases when inputs from source inhibitory neurons are received,
wherein the multiplexed neural core circuit is time multiplexed for the T sub-timesteps of the timestep, where synaptic weights and the neuron parameters are shared across the T sub-timesteps, and
wherein each of the T sub-timesteps is associated with a different set of the neuron destination locations and a different set of the neuron membrane potentials than the other sub-timesteps so that the multiplexed neural core circuit operates as four cores during a timestep, with each of the four cores having its own unique neuron destination locations and neuron membrane potentials.

2. The multiplexed neural core circuit of claim 1, wherein the synaptic interconnection network is shared across the T sets of electronic neurons, and a plurality of neuron destination locations is shared across the T sets of electronic neurons.

3. The multiplexed neural core circuit of claim 1, wherein:
the neuron membrane potentials each include a single or multi-bit state, and
each of the T sub-timesteps indicates when a firing event encapsulated within a spike event packet is generated.

4. The multiplexed neural core circuit of claim 1, wherein:
a neuron state is shared across the T sets of electronic neurons,
the synaptic interconnection network is shared across the T sets of electronic neurons,
the set of neuron parameters includes weights of axon types Syn0, Syn1, and Syn2, and
a plurality of neuron destination locations is shared across the T sets of electronic neurons.

5. The multiplexed neural core circuit of claim 1, wherein an operation of the multiplexed neural core circuit is described in terms of a plurality of discrete timesteps, and within a single discrete timestep, each set of the T sets of electronic axons is interconnected with its corresponding set of electronic neurons via the synaptic interconnection network.

6. The multiplexed neural core circuit of claim 5, further comprising:
dividing each of the plurality of discrete timesteps into T sub-timesteps,
assigning each set of the T sets of electronic axons and its corresponding set of electronic neurons one of the T sub-timesteps, and
interconnecting each set of the T sets of electronic axons with its corresponding set of electronic neurons via the synaptic interconnection network within their assigned one of the T sub-timesteps.

7. The multiplexed neural core circuit of claim 1, further comprising two distinct memory banks, the two distinct memory banks including:
a first memory bank comprising the synaptic interconnection network, the shared set of neuron parameters, the shared set of neuron destination locations, and a neuron state for all electronic neurons within the T sets of electronic neurons, and
a second memory bank comprising the set of axon buffers.

8. The multiplexed neural core circuit of claim 1, wherein the set of axon buffers is divided into T rows×max($\Delta$) columns, where max($\Delta$) is a number of time delays.

9. The multiplexed neural core circuit of claim 1, further comprising:
a first memory bank comprising the synaptic interconnection network, the shared set of neuron parameters, the shared set of neuron destination locations, and a neuron state for all electronic neurons within the T sets of electronic neurons; and
a second memory bank comprising the set of axon buffers;
wherein the first memory bank is implemented utilizing a first memory portion comprising the synaptic interconnection network and a second memory portion comprising the shared set of neuron parameters, the shared set of neuron destination locations, and the neuron state for all electronic neurons within the T sets of electronic neurons, where the first memory portion is different from or the same as the second memory portion.

10. A computer-implemented method for multiplexing a neural core circuit, comprising:
configuring T sets of electronic neurons, utilizing a hardware processor, where T is an integer multiplexing factor having a value of four;
configuring T sets of electronic axons, utilizing the hardware processor, where each set of the T sets of electronic axons corresponds to one of the T sets of electronic neurons;
configuring, utilizing the hardware processor, a synaptic interconnection network comprising a plurality of electronic synapses that each interconnect a single electronic axon to a single electronic neuron, where the interconnection network interconnects each set of the T sets of electronic axons to its corresponding set of electronic neurons; and
configuring, utilizing the hardware processor, a set of axon buffers divided into T partitions, where each of the T partitions is associated with one of T sub-timesteps of a timestep, and each of the T sub-timesteps includes:
a shared set of neuron parameters, the neuron parameters including a spike threshold, a leak rate, and axon type weights,
a shared set of neuron destination locations indicating a destination axon for each of the electronic neurons, and a different set of neuron membrane potentials from the other sub-timesteps, where each set of neuron membrane potentials includes a membrane potential V that increases when inputs from source excitatory neurons are received, and decreases when inputs from source inhibitory neurons are received, wherein the multiplexed neural core circuit is time multiplexed for the T sub-timesteps of the timestep, where synaptic weights and the neuron parameters are shared across the T sub-timesteps, and wherein each of the T sub-timesteps is associated with a different set of the neuron destination locations and a different set of the neuron membrane potentials than the other sub-timesteps so that the multiplexed neural core circuit operates as four cores during a timestep, with each of the four cores having its own unique neuron destination locations and neuron membrane potentials.

11. The computer-implemented method of claim 10, wherein the synaptic interconnection network is shared across the T sets of electronic neurons.

12. The computer-implemented method of claim 10, wherein a plurality of neuron parameters is shared across the T sets of electronic neurons.

13. The computer-implemented method of claim 10, wherein a plurality of neuron destination locations is shared across the T sets of electronic neurons.

14. The computer-implemented method of claim 10, wherein a neuron state is shared across the T sets of electronic neurons.

15. The computer-implemented method of claim 10, wherein an operation of the multiplexed neural core circuit is described in terms of a plurality of discrete timesteps, and within a single discrete timestep, each set of the T sets of electronic axons is interconnected with its corresponding set of electronic neurons via the synaptic interconnection network.

16. The computer-implemented method of claim 15, further comprising:
dividing each of the plurality of discrete timesteps into T sub-timesteps,
assigning each set of the T sets of electronic axons and its corresponding set of electronic neurons one of the T sub-timesteps, and
interconnecting each set of the T sets of electronic axons with its corresponding set of electronic neurons via the synaptic interconnection network within their assigned one of the T sub-timesteps.

17. The computer-implemented method of claim 10, further comprising storing two distinct memory banks, the two distinct memory banks including:
a first memory bank comprising the synaptic interconnection network, the shared set of neuron parameters, the shared set of neuron destination locations, and a neuron state for all electronic neurons within the T sets of electronic neurons, and
a second memory bank comprising the set of axon buffers.

18. A neurosynaptic system, comprising:
a neurosynaptic chip, a single-core neurosynaptic module as a component on a chip, or a multi-core neurosynaptic module as a component on a chip, including a plurality of multiplexed neural core circuits interconnected via an on-chip network, where each of the plurality of multiplexed neural core circuits comprises:
T sets of electronic neurons, where T is an integer multiplexing factor having a value of four,
T sets of electronic axons, where each set of the T sets of electronic axons corresponds to one of the T sets of electronic neurons,
a synaptic interconnection network comprising a plurality of electronic synapses that each interconnect a single electronic axon to a single electronic neuron, where the interconnection network interconnects each set of the T sets of electronic axons to its corresponding set of electronic neurons; and
a set of axon buffers divided into T partitions, where each of the T partitions is associated with one of T sub-timesteps of a timestep, and each of the T sub-timesteps includes:
a shared set of neuron parameters, the neuron parameters including a spike threshold, a leak rate, and axon type weights,
a shared set of neuron destination locations indicating a destination axon for each of the electronic neurons, and
a different set of neuron membrane potentials from the other sub-timesteps, where each set of neuron membrane potentials includes a membrane potential V that increases when inputs from source excitatory neurons are received, and decreases when inputs from source inhibitory neurons are received,
wherein the multiplexed neural core circuit is time multiplexed for the T sub-timesteps of the timestep, where synaptic weights and the neuron parameters are shared across the T sub-timesteps, and
wherein each of the T sub-timesteps is associated with a different set of the neuron destination locations and a different set of the neuron membrane potentials than the other sub-timesteps so that the multiplexed neural core circuit operates as four cores during a timestep, with each of the four cores having its own unique neuron destination locations and neuron membrane potentials.

19. The neurosynaptic system of claim 18, wherein the neurosynaptic chip, the single-core neurosynaptic module, or the multi-core neurosynaptic module is interconnected via an off-chip network.

20. The neurosynaptic system of claim 18, wherein the on-chip network is event-driven.

21. The neurosynaptic system of claim 19, wherein the off-chip network is event-driven.

22. The neurosynaptic system of claim 18, wherein one or more of the plurality of multiplexed neural core circuits have an integer multiplexing factor different from the other multiplexed neural core circuits of the plurality of multiplexed neural core circuits.

23. The neurosynaptic system of claim 22, wherein inter-core messages include spike packets that encode a relative address of a destination core, an electronic axon time delay, an address of a set of electronic axons, an axon address, and information that encodes a mapping between the integer multiplexing factor Ts of source cores and the integer multiplexing factor Td of destination cores.

* * * * *